United States Patent [19]

Mier

[11] Patent Number: 5,061,829
[45] Date of Patent: Oct. 29, 1991

[54] COMPOSITE CONDUCTOR RAIL OF ALUMINUM AND STEEL, IN PARTICULAR HIGH-PERFORMANCE RAILWAY CONDUCTOR RAIL

[75] Inventor: Gerhard Mier, Singen, Fed. Rep. of Germany

[73] Assignee: Alusuisse-Lonza Services Ltd., Zurich, Switzerland

[21] Appl. No.: 466,776

[22] Filed: Jan. 18, 1990

[30] Foreign Application Priority Data

Jan. 23, 1989 [CH] Switzerland .............................. 186/89

[51] Int. Cl.$^5$ .............................................. B60M 1/00
[52] U.S. Cl. ........................ 191/22 DM; 191/29 DM; 238/143
[58] Field of Search ............... 238/143, 144, 145, 146, 238/147; 191/22 DM, 29 DM; 29/522.1, 525.1

[56] References Cited

U.S. PATENT DOCUMENTS

| 3,356,276 | 12/1967 | Robinson, Jr. . | |
| 3,825,146 | 7/1974 | Hirmann | 29/522.1 X |
| 3,917,039 | 11/1975 | Maitland | 191/29 DM |
| 4,014,417 | 3/1977 | Kugler et al. . | |

FOREIGN PATENT DOCUMENTS

| 2546026 | 4/1977 | Fed. Rep. of Germany ........ 191/29 DM |
| 3543831 | 7/1987 | Fed. Rep. of Germany . |
| 2176200 | 10/1973 | France . |
| 31830 | 3/1981 | Japan ............................. 191/22 DM |
| 207235 | 9/1986 | Japan ............................. 191/29 DM |
| 215637 | 8/1989 | Japan ............................. 191/22 DM |

Primary Examiner—David A. Bucci
Assistant Examiner—Craig Slavin
Attorney, Agent, or Firm—Bachman & LaPointe

[57] ABSTRACT

The composite conductor rail comprises an aluminum base-section (12) and at least one steel strip (12) as power transfer surface for the power collector. The aluminum base-section is connected in a mechanically stable manner and with good electrical contact to at least one small extruded composite section made of a steel strip and an aluminum retaining section which is ductile, exhibits high electrical conductivity and holds the steel strip in place.

21 Claims, 4 Drawing Sheets

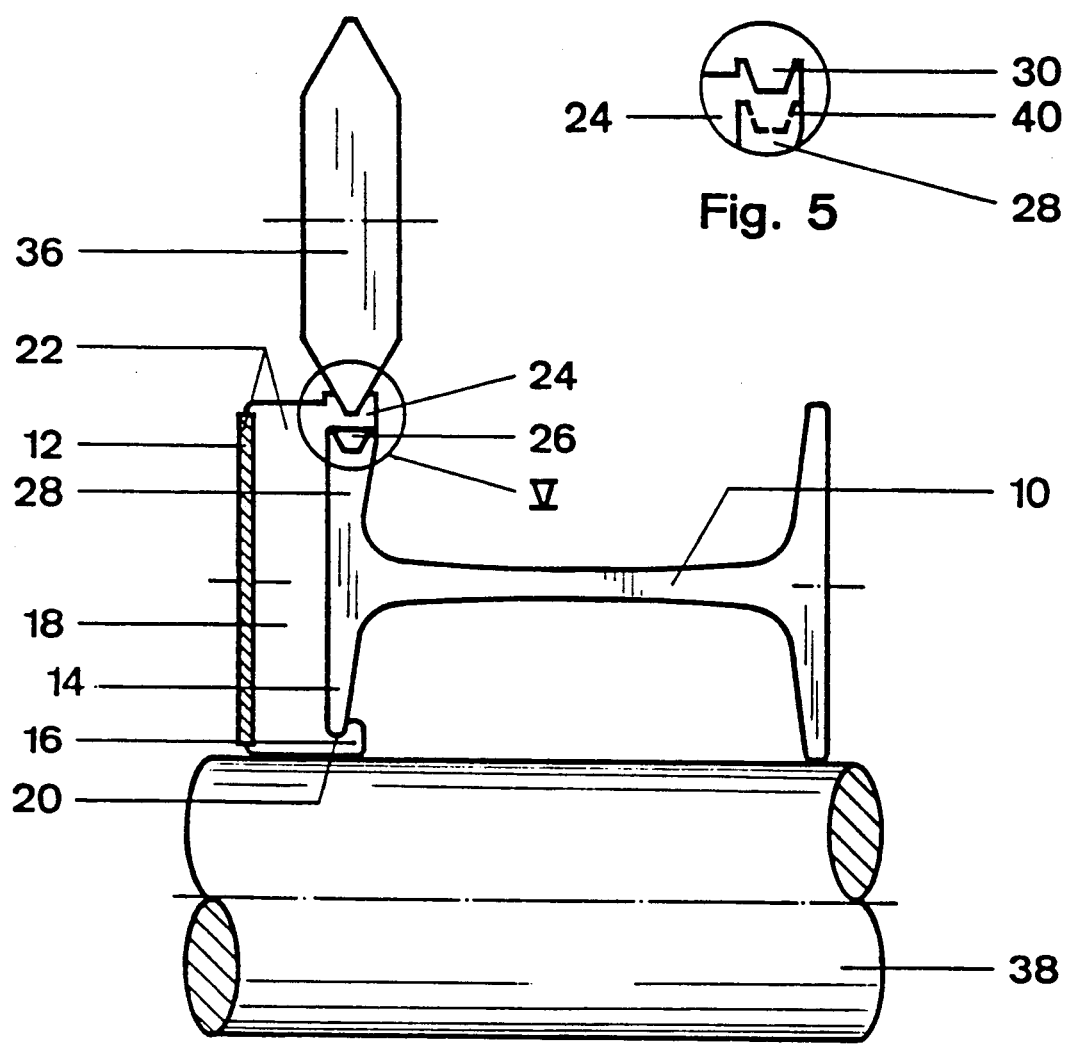
Fig. 4
Fig. 5
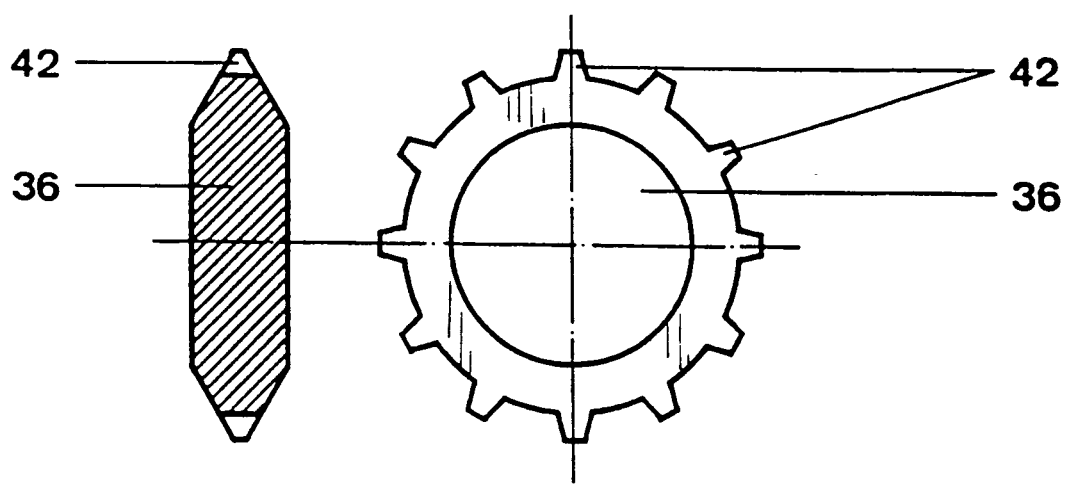
Fig. 6   Fig. 7

COMPOSITE CONDUCTOR RAIL OF ALUMINUM AND STEEL, IN PARTICULAR HIGH-PERFORMANCE RAILWAY CONDUCTOR RAIL

BACKGROUND OF THE INVENTION

The invention relates to a composite conductor rail, in particular a high-performance railway conductor rail having an aluminum base-section and, as contact surface for the power collector, at least one steel strip.

For those cases where overhead or open line power supplies do not come into question for supplying electric power to electric trains, cabin-taxis, travelling cranes and the like, it is known to make use of conductor rails. The large weight of a conductor rail made solely of steel can be reduced to about 1/7 by a combined aluminum-steel conductor rail, at the same time maintaining the same electrical conductivity.

The following manufacturing methods have been employed up to now on an industrial scale:
Coextrusion of an aluminum section with a steel strip
Bolting aluminum plates onto the sides of a steel section
Clamping a U-shaped steel sheet onto an aluminum section
Casting aluminum into the sides of a steel I-beam.

Of these methods coextrusion is particularly advantageous as it produces a metallic bond between the steel and the aluminum. This connection not only ensures an optimal transfer of current, but also prevents any crevice corrosion in the region of transition between the two metals.

Although coextruded conductor rails exhibit considerable advantages over other versions, their unlimited economic application, in particular in high-performance railway conductor rails, is narrowed down by a plurality of parameters such as for example the maximum possible outer dimensions, extrusion speed and in the case of hollow sections by the wall thickness. Using the present state of the art it is possible to produce coextruded steel-aluminum conductor rails only up to a weight per running meter of at most about 18 kg and a section height of at most about 130 mm.

Today, however, conductor rails with larger dimensions are sometimes necessary, in particular for electric railways; such rails cannot be made or cannot be made economically by the basically advantageous coextrusion method with the present-day means.

The object of the present invention is therefore to develop a composite conductor rail as discussed above, which is not limited in height or weight of extrusion by extrusion parameters and provides therefore any desired power-carrying capacity, in particular also in excess of 4700A. This conductor rail should exhibit a mechanical strength capable of withstanding the vibrational stressing and temperature changes in the rough conditions of a rail transportation system both in tunnels and in the open air, and this for a period of 30–50 years. Furthermore, the conductor rail should as a whole ensure good current transfer, be universally applicable and economic to manufacture.

SUMMARY OF THE INVENTION

The object is achieved by way of the invention in that the aluminum base-section, mechanically stable and a good electrical conductor, is connected to at least, one small extruded composite section comprising an aluminum retaining section, that is ductile and highly conductive to electricity and a steel strip.

In contrast to one of the normal coextruded conductor rails, the metallic bonding of steel to aluminum is no longer between the steel strip and the aluminum base section, but between the steel strip and a retaining section which holds the steel strip is small in dimension, preferably geometrically simple and is always made of highly conductive ductile aluminum or an aluminum alloy with the appropriate properties. This composite section is then in turn connected to the aluminum base-section via the ductile aluminum retaining section.

The composite section made up of the ductile aluminum retaining section and the steel strip usefully has a cross-section which is essentially in the form of an elongated rectangle. In a manner analogous to conventional solution steel strip is partly embedded in a longitudinal recess in the retaining section.

It has been found expedient to design the retaining section 2–10 times, in particular 3–5 times, as thick as the steel strip.

The mechanically stable and highly conductive connection of the composite section to the base-section is preferably made by means that create metallic bonding. This has recognised advantages over bolting or clamping type connections, which can however in principle also be used.

The invention is explained in greater detail in the following discussion with the aid of the schematic drawing of exemplified embodiments.

FIG. 4 shows the principle of plastic deformation on one side using a compression roll.

FIG. 5 shows region V i FIG. 4 after compression, shown here slightly magnified.

FIG. 6 shows a cross-sectional view of a cogged compression roll, looking perpendicular to the axis of rotation.

FIG. 7 shows a view along the axis of rotation of a cogged compression roll.

DETAILED DESCRIPTION

Figure 1:
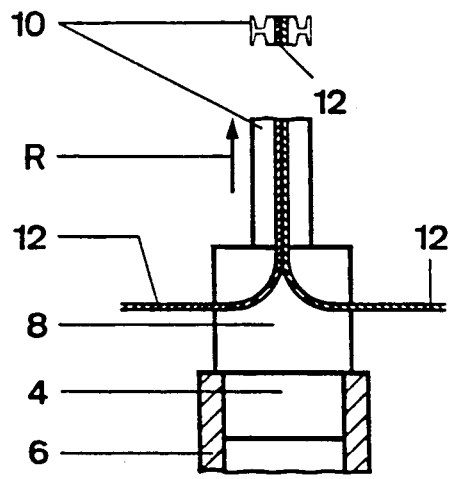
FIGS. 1 and 1a show the known method of coextrusion.

A first version is such that the ductile aluminum retaining section features at least on one side a flange which becomes anchored by plastic deformation in a corresponding recessed, longitudinal groove in the base-section. The pressure applied and the deformation are so great that metallic bonding takes place.

The intensity of the connection between the retaining section and the base-section can be increased further by at least the base-section featuring teeth made by extrusion, in the region where plastic deformation occurs.

A second version is such that the ductile aluminum retaining section is welded to the base-section along at least one longitudinal side, preferably by means of a weld bead.

In the case of both the first and second versions it is possible to interlock the ductile retaining section and base-section along the non-plastically deformed or non-welded longitudinal side in such a manner that a connection which is mechanically stable and highly conductive to electricity is formed also on that side. With such a solution, however, in contrast to plastic deformation or welding on both sides, metallic bonding is achieved on only one longitudinal side.

In the region of the connection where there is no plastic deformation or welding of the ductile retaining section to the base-section it is possible to apply a well known contact grease.

Besides the retaining section it is also possible for the base-section to be made of a ductile pure aluminum or a ductile aluminum alloy if the mechanical strength of the base-section plays a minor role compared with the electrical conductivity. Normally, however, the base-section is made of a high strength aluminum alloy.

The ductile retaining section and a possibly ductile base-section are preferably of pure aluminum for example A99.5, conductor grade Al(99.5) or Al99.8, or of an aluminum-magnesium-silicon alloy, for example AlMgSi 0.5, conductor grade AlMgSi 0.5 or Al99.75 MgSi.

If the base-section is of a high strength aluminum alloy, this age-hardens preferably after joining the base-section to the composite section. High strength aluminum alloys to be used are for example the AlMgSi, AlMgMn or AlMgCuMn alloys known to the expert in the field.

The above mentioned ductile aluminum alloys exhibit an electrical conductivity of the order of 30 m/$\Omega$.mm$^2$, pure aluminum on the other hand a value of at least 35 m/$\Omega$.mm$^2$. The aluminum alloys for the base-section lie at about 18–26 m/$\Omega$.mm$^2$.

The steel strips which along with the retaining section make up the composite section and form the long-lasting, highly wear-resistant contact face of the conductor rail are made of stainless steel, such as for example $\times$5 CrNi/89 (DIN 17440) or $\times$6 Cr 18. The electrical conductivity of the steel strip lies much lower than that of the high strength aluminum base-section viz., at about 1–2 m/$\Omega$./mm$^2$.

All alloys are utilised in conditions of temper known to the expert in the field.

The composite conductor rails according to the invention can be produced in all necessary cross-sectional shapes and dimensions. At the same time, a composite section made up of a steel strip and a retaining section can be mounted in any position and at any angle on the base-section, in particular parallel to or perpendicular to the base of the base-section. Further, more than one composite section can be mounted on the base-section, in particular if these are angled for side-mounted current collectors.

The composite conductor rail according to the invention makes it possible in particular also to manufacture high-performance railway conductor rails which up to now could not be produced by coextrusion because the weight per running meter or the dimensions were too large.

At the same time the manufacturing costs can be reduced as only a relatively small aluminum cross-section has to be extruded with the steel strip. This aluminum cross-section is selected to be only sufficiently large to be technically and economically necessary for the extrusion process.

It is, from the standpoint of cost, more favorable to extrude the much larger cross-section of the base-section as a normal extrusion and then to subsequently join it to the steel-aluminum composite section. Normal sections can be produced at considerably greater extrusion speeds than composite sections and incur therefore significantly lower manufacturing costs per kg.

This savings in costs outweighs by far the costs for joining the composite section to the base-section, in particular with large cross-sections.

The composite conductor rail according to the invention has the further advantage that a highly conductive, ductile aluminum retaining section can be employed for the composite section, without any notable detriment to the mechanical robustness of the conductor rail as a whole. The necessary robustness of the conductor rail which is required especially in railway networks, is determined by the steel strip and by the base-section, the latter of which is always made of a high strength aluminum alloy when mechanical robustness is required. In contrast to a ductile aluminum alloy, a high strength aluminum alloy resists also a large area being pressed when abutting conductor rails are joined by self-locking bolts.

Apart from the high electrical conductivity, a ductile aluminum retaining section has another advantage for the composite section as a whole. The different thermal expansion of steel and aluminum produces shear forces in the interface between the two metals when temperature fluctuations occur. These shear forces are reduced as a result of the low yield stress of pure aluminum or ductile aluminum alloy.

With a high power conductor rail according to the invention standardizing the composite sections is made much easier. The different requirements of the railway authorities regarding the height and dimensions of attachment of the conductor rail can be satisfied by adapting the base-section accordingly; in the case of the composite section, the same dimensions can generally be employed. This results in particular in economic advantages as the tooling costs for a normal base-section are only a fraction of those for a composite section.

Referring to the drawings, the principle of the known method of coextrusion of an aluminum section with a steel strip is illustrated in FIG. 1. For reasons relating to the extrusion process itself two composite conductor rails, each with an aluminum base-section 10 and steel strip 12 are produced simultaneously. The two steel strips 12, lying one upon the other, are introduced from two sides into the extrusion die 8 and deflected 90° inside the die into the direction of extrusion R. In the welding chamber of the die 8 the aluminum of the extrusion billet 4 fed from the container 6 joins itself to the steel strip 12 by diffusion processes, as a result of which a metallic bond is created.

Because of the 90° deflection it is possible to employ only flat steel strips 12; stiff steel sections would be unusable.

The composite sections of steel strip 12 and full aluminum base section 10 extruded end-to-end are indicated in the uppermost part of FIG. 1 emerging from the die 8.

Figure 1A:
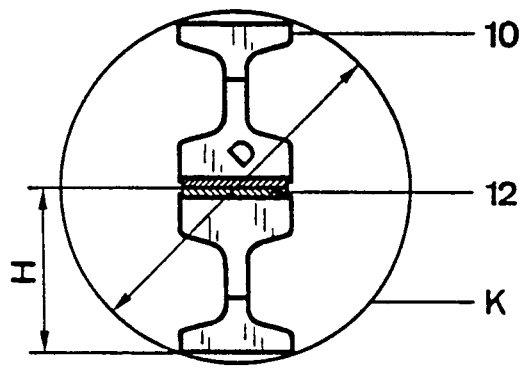

As shown in FIG. 1a, the end-to-end extruded composite sections can also have a hollow aluminum base-section 10.

The rate of extruding end- to-end composite sections is much lower than with normal aluminum sections.

For manufacturing reasons the diameter D of the circle K (FIG. 1a) circumscribing the composite sections which is dependent on the capacity of the press, is limited. At a maximum diameter D of 280 mm for example the maximum height H of composite section resulting is about 130 mm.

Figure 2:
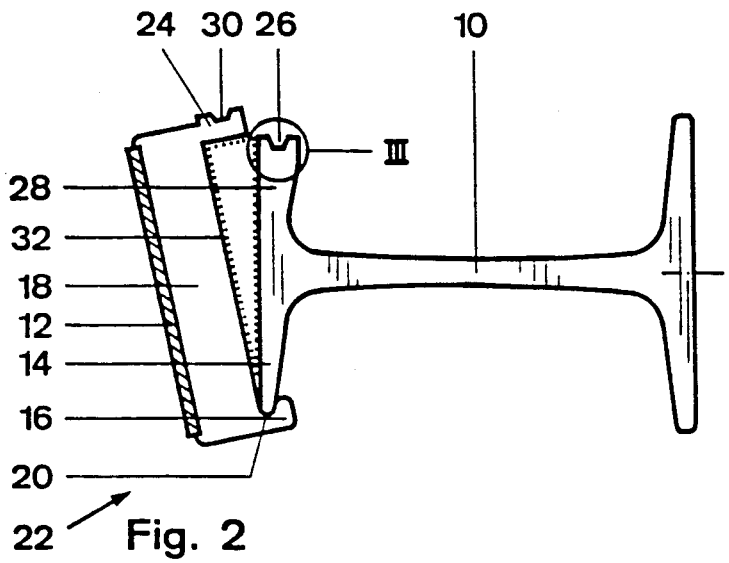
FIG. 2 shows placing the base-section in the composite section for plastic deformation.

Referring to FIG. 2 of the present invention, the base-section 10, I-beam shaped in cross-section and made of a high-strength aluminum alloy, has its extended flange 14 residing by virtue of push-fit in a groove 20 formed by projection 16 in the ductile aluminum section. The retaining section 18 that, along with the steel strip 12, forms the extruded composite section 22 features a longitudinal flange 24 which, after complete rotation of the base-section 10, comes to rest over flange 28 featuring a longitudinal groove 26.

Also flange 24 of retaining section 18 features a longitudinal outer groove 30 which comes to rest over groove 26.

The surface of the retaining section 18 and base-section 10, which lie against each other when the base-section 10 is in its final position, are coated with high purity vaseline, a contact grease 32. If desired this contact grease 32 can also be deposited on only one of the surfaces making contact.

Figure 3:
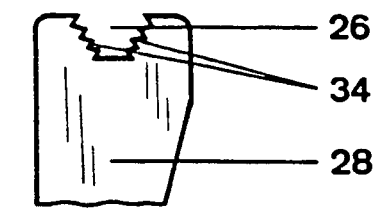
FIG. 3 shows a detail of region III in FIG. 2.

FIG. 3 shows, enlarged, an end view of flange 28 of base-section 10 with longitudinal groove 26. Teeth 34 made on extruding the part can be seen in both sidewalls of groove 26. These teeth 34 provide improved electrical contact on pressing flange 24 of retaining section 18 into groove 26 in the base-section 10, this being done for example by means of a compression roll (FIGS. 4,6,7) running in groove 30 (FIG. 2).

FIG. 4 shows the composite section 22 with base-section 10 rotated completely into place. The flange 14 has been pushed into groove 20 formed by projection 16; flange 24 lies over flange 28. A stationary compression roll 36 the elevation of which can be varied has been introduced into the longitudinal groove 30 (FIG. 2) of flange 24; the compression roll 36 tapers towards its outer circumference in the form of a trapezium. The base-section 10 and composite section 22 to be joined run over a conventional table roller 38.

To achieve the plastic deformation, the ductile material of flange 24 is pressed into the groove 26 which can feature tooth-like rills (FIG. 3). With that a metallic bond is created between composite section 22 and base-section 10.

FIG. 5 shows the composite section after compression. The region of metallic bonding between the flange 24 of the retaining section 18 and the flange 28 of base-section 10 is indicated by a broken line 40. The extruded steel-aluminum composite section 22 is thus connected securely and with good electrical conductance to the base-section 10.

Not shown in the drawing is that a roll of the roll table 38 can be replaced by a further compression roll so that metallic bonding by plastic deformation can be achieved on both sides.

In FIGS. 5,6,7 a compression roll 36 with teeth or cogs is shown, with which the plastic deformation and so the metallic bonding is not continuous (FIG. 4) but instead is localized at a series of points. Usefully the geometry of the teeth arrangement and the roller table 38 (FIG. 4) are in agreement so that the impression of a tooth 42 is made each time in a position where the composite section 22 lies on a roll.

Figure 8:
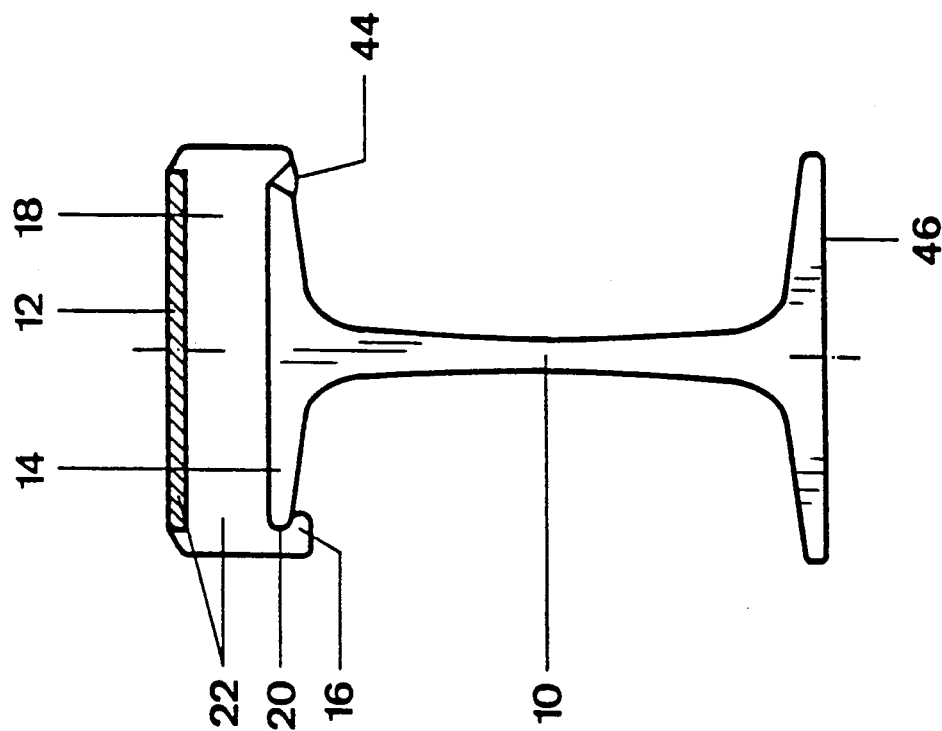
FIG. 8 shows a cross-section through a composite conductor rail welded at one side.

The composite conductor rail as in FIG. 8 is manufactured by pushing the base-section 10 into the groove 20, tilting it into the composite section 22 and joining it to the section 18 by means of a longitudinal weld bead 44 so that the base-section is attached mechanically in a sound manner and with good electrical contact. The steel strip 12 which forms the power transfer surface for the current collector runs parallel to the mounting surface 46 of the base-section 10.

Figure 9:
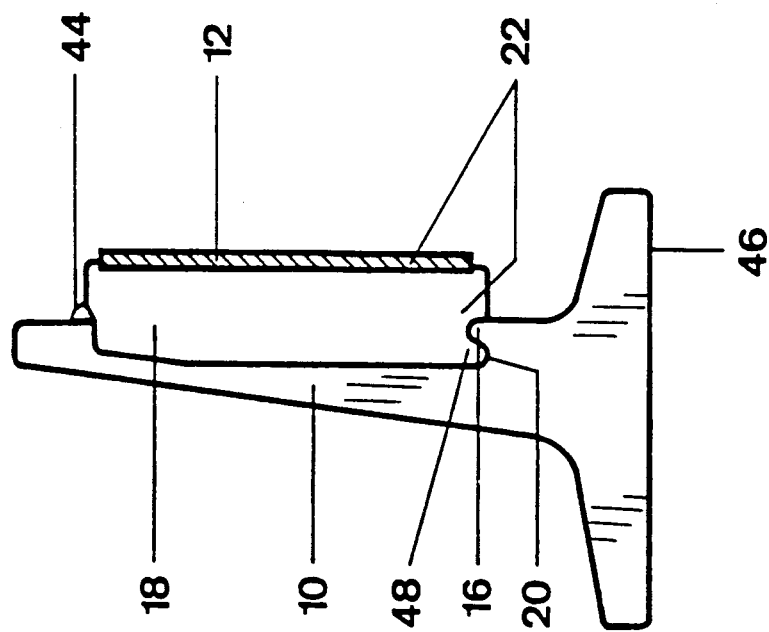
FIG. 9 shows a cross-section through a composite conductor rail welded at one side and having approximately vertical current transfer surface.

The version according to FIG. 9 is such that the power transfer surface of the steel strip 12 runs approximately perpendicular to the mounting surface of the base-section 10. On its lower side the composite section 10 is joined to the base-section 22 by a push-fit connection. The groove 20 is formed by a projection 16 on the base-section 10; into which groove 20 a corresponding projection 48 on the retaining section 18 has been pushed. On the upper side the retaining section 18 and the base-section 10 are joined by a weld bead 44 or by spot welding.

Figure 10:
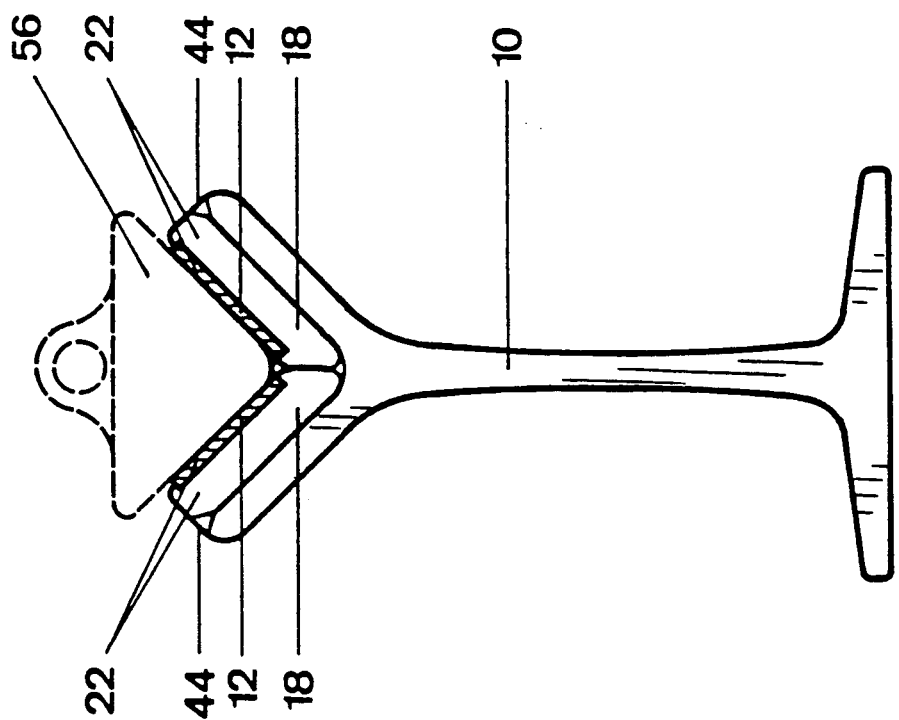
FIG. 10 shows a cross-section through a composite conductor rail having two composite sections.

The upper part of the aluminum base-section 10 in FIG. 10 is essentially Y-shaped. In the channel formed there two composite sections 22 each featuring a steel strip 12 and a retaining section 18 have been inserted and each joined in a mechanically sound manner and with good electrical contact to the aluminum base-section 10 by means of a weld bead 44.

A current collector 56 indicated by broken lines slides simultaneously on both steel strips 12 which form an angle between them and thus guide the current collector at its sides.

A composite conductor rail of the form shown in FIG. 10 would not be possible with a normal composite section alone because of the angled current transfer surface. The reason for that is that state-of-the-art coextruded composite conductor rails may only have a flat steel strip 12 as wear resistant power transfer insert as this must be bent around 90° in the known coextrusion process.

Figure 11:
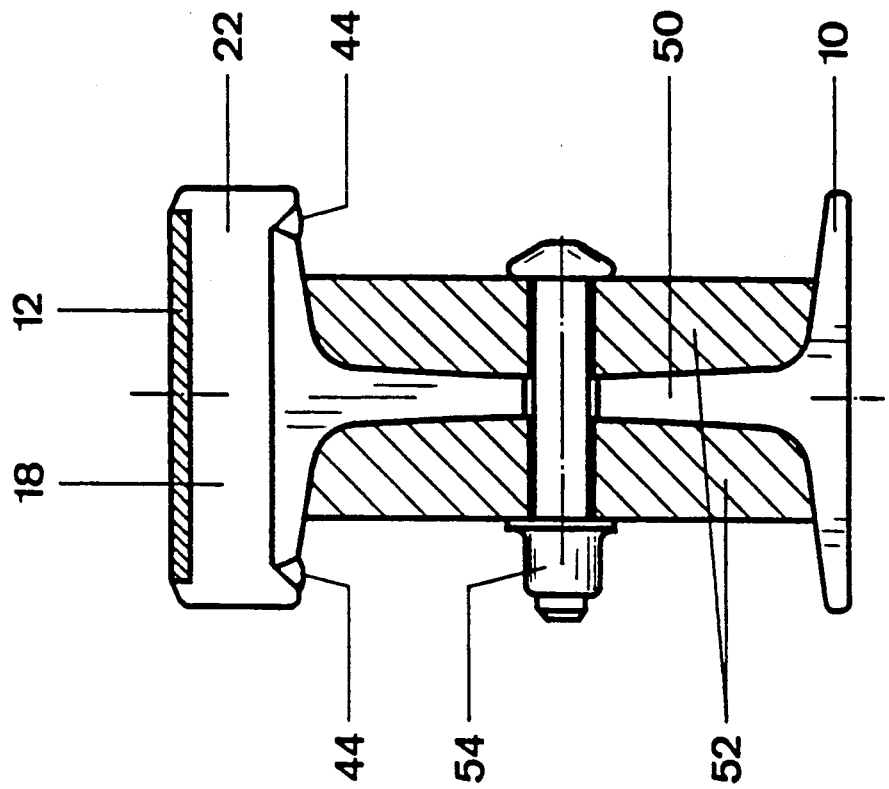
FIG. 11 shows a cross-section through a composite conductor rail welded at both sides, illustrated here in the region of joining to another composite conductor rail.

In the region where two abutting composite conductor rails meet, as shown in FIG. 11, two fishplates 52 of high strength aluminum alloy have been pressed onto the center strut 50 of the base-section 10. This pressure is effected by a plurality of self-locking bolts 54 which form a so-called Huckbolt connection. The base-section 10 comprises likewise of a high strength aluminum alloy; a ductile aluminum alloy could start to flow under the applied load.

The steel-aluminum composite section 22 is connected to the base-section 10 by two weld beads 44.

Although the base-sections 10 are represented in the exemplified embodiments only by solid sections, the same can of course also be in the form of hollow sections such as for example in the state-of-the-art version shown in FIG. 1a.

Furthermore, ductile base-sections 10, not shown here, are substantially more massive than the base-sections of high strength aluminum shown in the examples here.

What is claimed is:

1. Composite conductor rail, in particular high performance conductor rails for railway systems, which comprises an aluminum base section and at least one steel strip as power transfer surface for current collectors, wherein the aluminum base section is connected in a mechanically stable manner and with good electrical contact to at least one extruded composite section of a ductile aluminum retaining section exhibiting high electrical conductivity and a steel strip, wherein said connection includes at least one portion of the aluminum base section locked to at least one portion of said extruded composite.

2. Conductor rail according to claim 1, wherein the cross-section of the composite section is essentially in the form of an elongated rectangle.

3. Conductor rail according to claim 2, wherein the aluminum retaining section includes a longitudinal recess and wherein the steel strip is embedded in the longitudinal recess in the retaining section.

4. Conductor rail according to claim 1 wherein the retaining section is 2-10 times as thick as the steel strip.

5. Conductor rail according to claim 4 wherein the retaining section is 3-5 times as thick as the steel strip.

6. Conductor rail according to claim 1 wherein the ductile retaining section includes a flange and the aluminum base section includes a longitudinal groove, with the flange on the ductile retaining section plastically deformed and anchored in the longitudinal groove in the base section.

7. Conductor rail according to claim 6 wherein the flange on the ductile retaining section is on at least one longitudinal side thereof.

8. Conductor rail according to claim 6 wherein the deformed flange and groove create a metallic bond.

9. Conductor rail according to claim 6 wherein at least the base section features teeth in the region of plastic deformation.

10. Conductor rail according to claim 9 wherein said teeth are in said groove.

11. Conductor rail according to claim 1 wherein the ductile retaining section is welded to the base section along at least one longitudinal side.

12. Conductor rail according to claim 11 wherein said welding is by means of a weld bead.

13. Conductor rail according to claim 1 wherein the ductile retaining section and the base section have corresponding longitudinal sides and wherein said retaining section and base section abut each other along the corresponding longitudinal sides.

14. Conductor rail according to claim 13 including a groove delimited by a projection on the base section engaging a corresponding projection on the retaining section, wherein the corresponding longitudinal side abut adjacent said engagement.

15. Conductor rail according to claim 1 including a contact grease in the region of joining the ductile retaining section to the base section.

16. Conductor rail according to claim 15 wherein said contact grease is high purity vaseline.

17. Conductor rail according to claim 1 wherein at least the ductile retaining section is of a material selected from the group consisting of electrical grade aluminum, pure aluminum and an AlMgSi alloy.

18. Conductor rail according to claim 17 wherein both the ductile retaining section and the base section are of said material.

19. Conductor rail according to claim 1 wherein the base section is of a high strength alloy that is age-hardened.

20. Composite conductor rail, in particular high performance conductor rails for railway systems, which comprises an aluminum base section and at least one steel strip as power transfer surface for current collectors, wherein the aluminum base section is connected in a mechanically stable manner and with good electrical contact to at least one extruded composite section of a ductile aluminum retaining section exhibiting high electrical conductivity and a steel strip, wherein the ductile retaining section and the base have corresponding longitudinal sides and wherein said retaining section and base section abut each other along the corresponding longitudinal sides, said rail including a groove delimited by a projection on the retaining section and an elongated flange on the base section, wherein groove and flange engage and the corresponding longitudinal sides abut adjacent said engagement.

21. Composite rail according to claim 1 wherein said connection includes at least one portion of the base section and extruded composite which are bonded together and at least one portion of the base section and extruded composite having a hinge-like interlocking.

* * * * *